United States Patent
Bacher

(10) Patent No.: US 11,374,342 B2
(45) Date of Patent: Jun. 28, 2022

(54) PLUG AND SOCKET FOR CONNECTING TO A THERMAL CONDUCTOR PROTECTED AGAINST POLARITY REVERSAL

(71) Applicant: IPETRONIK GmbH & Co. KG, Baden-Baden (DE)

(72) Inventor: Stephan Bacher, Olching (DE)

(73) Assignee: IPETRONIK GMBH & CO. KG

( * ) Notice: Subject to any disclaimer, the term of this patent is extended or adjusted under 35 U.S.C. 154(b) by 0 days.

(21) Appl. No.: 16/754,087

(22) PCT Filed: Oct. 1, 2018

(86) PCT No.: PCT/EP2018/076689
§ 371 (c)(1),
(2) Date: Sep. 14, 2020

(87) PCT Pub. No.: WO2019/072618
PCT Pub. Date: Apr. 18, 2019

(65) Prior Publication Data
US 2021/0013657 A1  Jan. 14, 2021

(30) Foreign Application Priority Data
Oct. 10, 2017  (DE) .................... 10 2017 009 401.2

(51) Int. Cl.
*H01R 13/24* (2006.01)
*G01K 7/02* (2021.01)
(Continued)

(52) U.S. Cl.
CPC ......... *H01R 13/2421* (2013.01); *G01K 7/023* (2013.01); *H01R 13/10* (2013.01);
(Continued)

(58) Field of Classification Search
CPC ........... H01R 13/2421; H01R 13/5812; H01R 13/10; H01R 24/20; H01R 24/28; H01R 2103/00; H01R 2201/20; G01K 7/023
See application file for complete search history.

(56) References Cited

U.S. PATENT DOCUMENTS

| 5,910,030 A | 6/1999 | Hollander et al. |
| 6,183,269 B1 | 2/2001 | Sarkissian et al. |

(Continued)

FOREIGN PATENT DOCUMENTS

| DE | 202015106200 | 12/2015 |
| DE | 102014017157 | 1/2016 |

(Continued)

OTHER PUBLICATIONS

International Search Report for PCT/EP2018/076689, dated Nov. 23, 2018, 5 pages.

*Primary Examiner* — Briggitte R. Hammond
(74) *Attorney, Agent, or Firm* — Quarles & Brady LLP

(57) ABSTRACT

The present invention relates to a plug and a socket, which are each designed to be capable of being connected to a coded thermal line protected against polarity reversal. To this end the plug and the socket each comprise a recess which is configured to receive, in a manner protection against polarity reversal, a thermal line with an asymmetrically designed cross section and a first and a second electrically conductive plug or socket element which each comprise a first and a second area. The first area of the plug and socket elements each comprise a spring contact, and the plug and socket elements are arranged in such a manner that the two spring contacts each contact substantially axially a core of a received thermal line.

13 Claims, 11 Drawing Sheets

(51) Int. Cl.
- *H01R 13/10* (2006.01)
- *H01R 13/506* (2006.01)
- *H01R 13/58* (2006.01)
- *H01R 24/20* (2011.01)
- *H01R 103/00* (2006.01)
- *H01R 24/28* (2011.01)

(52) U.S. Cl.
CPC ....... *H01R 13/506* (2013.01); *H01R 13/5812* (2013.01); *H01R 24/20* (2013.01); *H01R 24/28* (2013.01); *H01R 2103/00* (2013.01); *H01R 2201/20* (2013.01)

(56) References Cited

U.S. PATENT DOCUMENTS

| | | | |
|---|---|---|---|
| 6,183,304 B1* | 2/2001 | Hollander | G01K 7/023 439/620.05 |
| 8,545,277 B2* | 10/2013 | Ondusko | H01R 9/2675 439/884 |
| 2005/0112945 A1* | 5/2005 | Park | H01R 4/48 439/620.21 |

FOREIGN PATENT DOCUMENTS

| | | |
|---|---|---|
| DE | 102016200243 | 7/2017 |
| EP | 1533869 | 5/2005 |

* cited by examiner

PLUG AND SOCKET FOR CONNECTING TO A THERMAL CONDUCTOR PROTECTED AGAINST POLARITY REVERSAL

CROSS-REFERENCE TO RELATED APPLICATIONS

This application represents the national stage entry of PCT International Application No. PCT/EP2018/076689, filed Oct. 1, 2018, which is based on DE 102017009401.2, filed Oct. 1, 2017, and claims benefit and priority thereto.

FIELD OF THE INVENTION

The present invention relates to a plug for an electrical plug-in connection, a socket for an electrical plug-in connection, and a system comprising a plug and socket. The present invention relates in particular to a plug, a socket, and a system comprising a plug and socket for connecting to a thermal conductor protected against polarity reversal.

BACKGROUND OF THE INVENTION

Plug-in connections (also referred to as plug-in connectors) are known in general, in which a plug can be plugged into a socket in order to obtain an electrical connection between two lines extending from the plug and socket respectively.

Furthermore, plug-in connectors for thermocouples and resistance thermometer measurement systems are known in general. Such a plug-in connector comprises a thermal plug and a thermal socket that can be used for connecting two thermoelectric conductors.

As such, numerous such (thermal) plugs and (thermal) sockets (also referred to as "thermal plug-in connectors") can be used for thermoelectric conductors in the automobile industry and supply industry as part of a measurement system in test vehicles.

In particular, plug-in connectors are used in measurement systems in which the temperature at a specific measurement point is determined via a so-called thermocouple. Such a thermocouple is composed of two wires containing different substances, the so-called thermoelectric conductor, which are each connected at one end. The (measurement point) temperature is determined via a voltage difference caused by the different conductor materials in the thermoelectric conductor.

The thermoelectric conductor in the thermocouple can be connected within the measurement system to another thermoelectric conductor, which opens, e.g., into a module block. The measured data can be amplified and digitalized in signal processors, and subsequently forwarded to data loggers from there.

A thermoelectric conductor and a module block are known from DE 10 2014 017157 B3, in which the thermoelectric conductor has a cross section that protects the dual core thermoelectric conductor against polarity reversal when connected electrically to the module block.

The object of the present invention is to create an improved plug-in connector (or a plug and a socket) that can be connected to a thermoelectric conductor.

BRIEF DESCRIPTION OF THE INVENTION

According to a first aspect, the present invention provides a plug for an electrical plug-in connection according to claim 1.

According to a second aspect, the present invention provides a socket for an electrical plug-in connection according to claim 9.

According to a third aspect, the present invention provides a system comprising a plug and a socket according to claim 11.

Further aspects and features of the present invention can be derived from the dependent claims, the attached drawings, and the following description.

BRIEF DESCRIPTION OF THE DRAWINGS

Exemplary embodiments of the invention shall be explained merely by way of example, with reference to the attached figures, in which.

DESCRIPTION OF THE PREFERRED EXEMPLARY EMBODIMENTS

Figure 1:
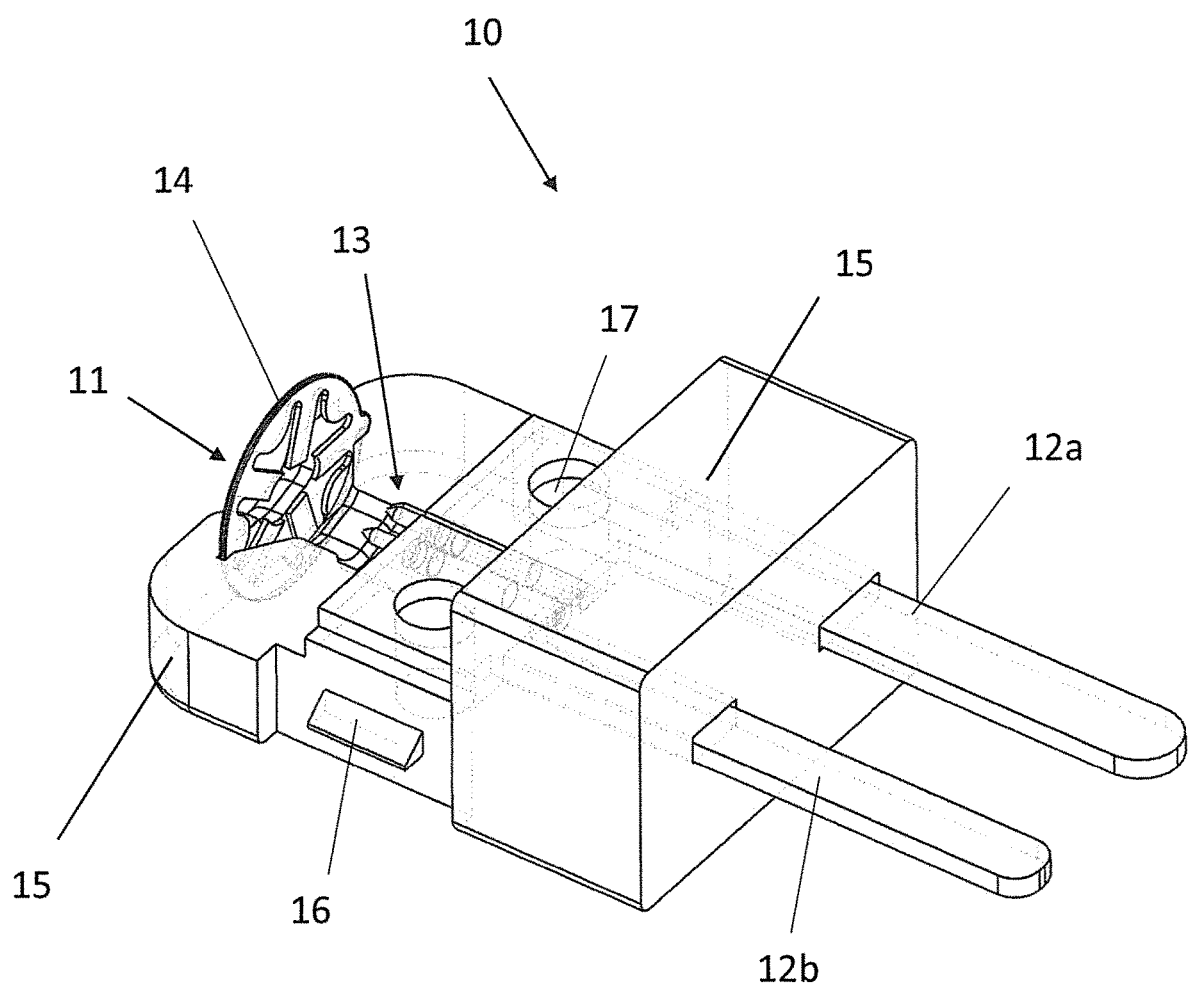
FIG. 1 shows a perspective view of a plug according to an exemplary embodiment of the present invention.
Figure 2:
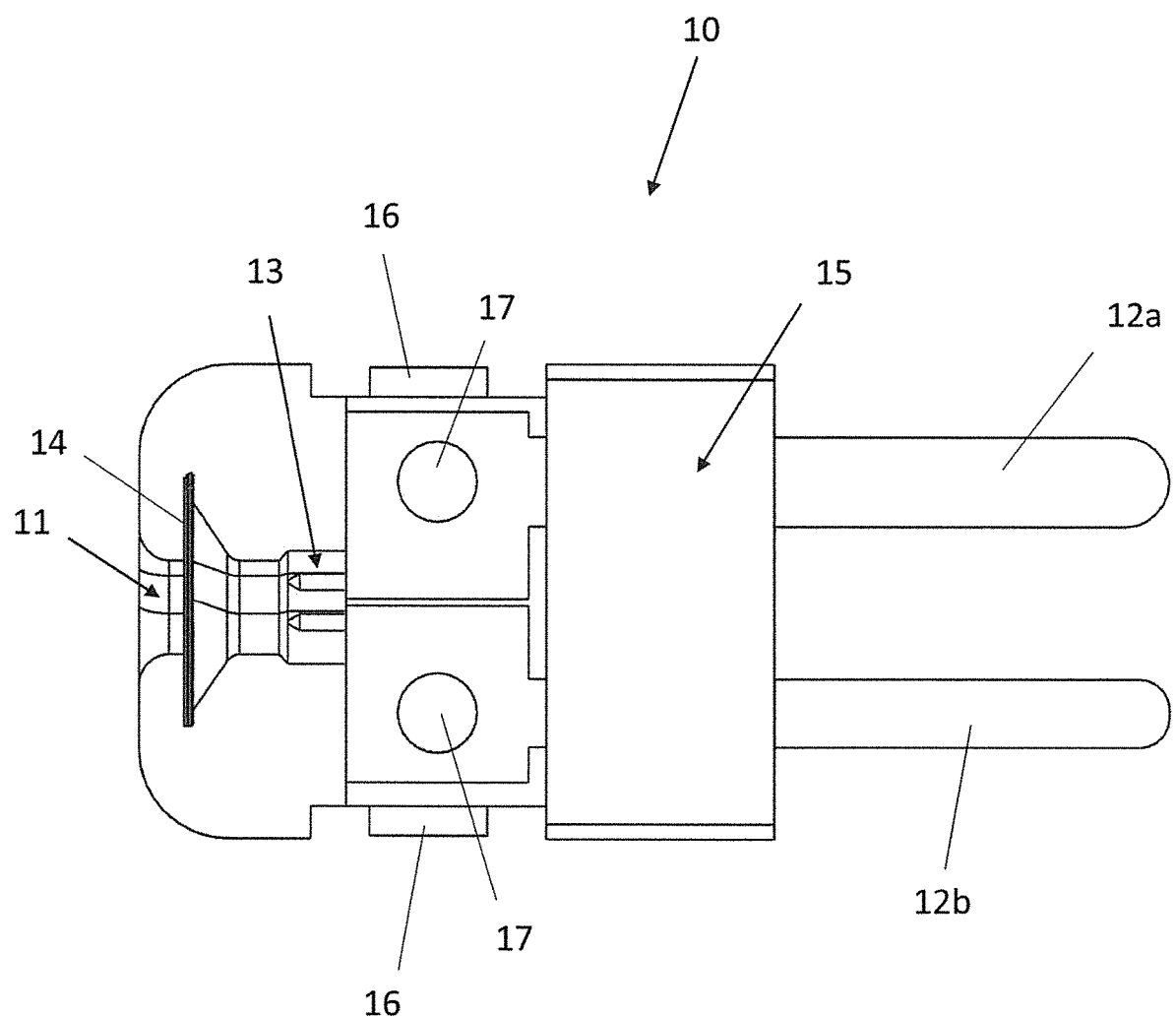
FIG. 2 shows a top view of a plug according to a preferred exemplary embodiment of the present invention.
Figure 3:
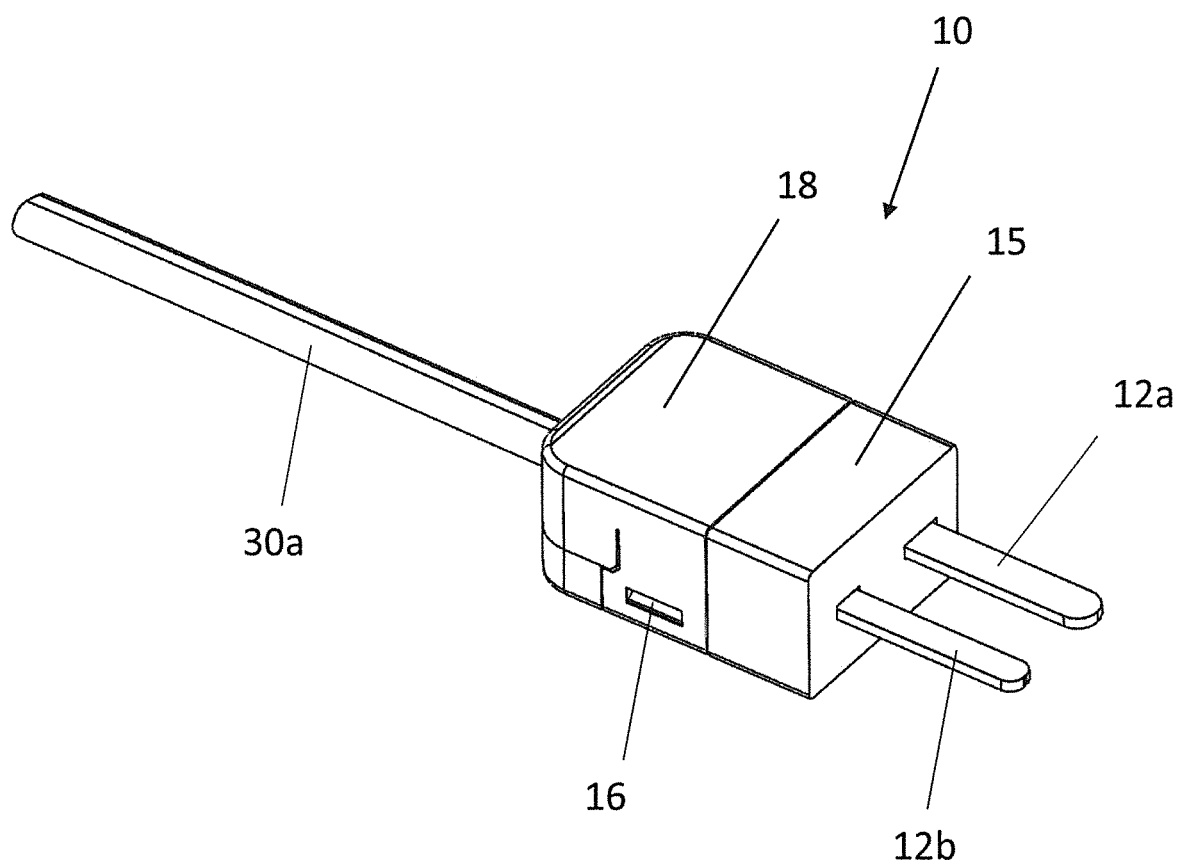
FIG. 3 shows a schematic illustration of an exemplary embodiment of the plug according to the invention, with an encoded thermoelectric conductor protruding therefrom.
Figure 4:
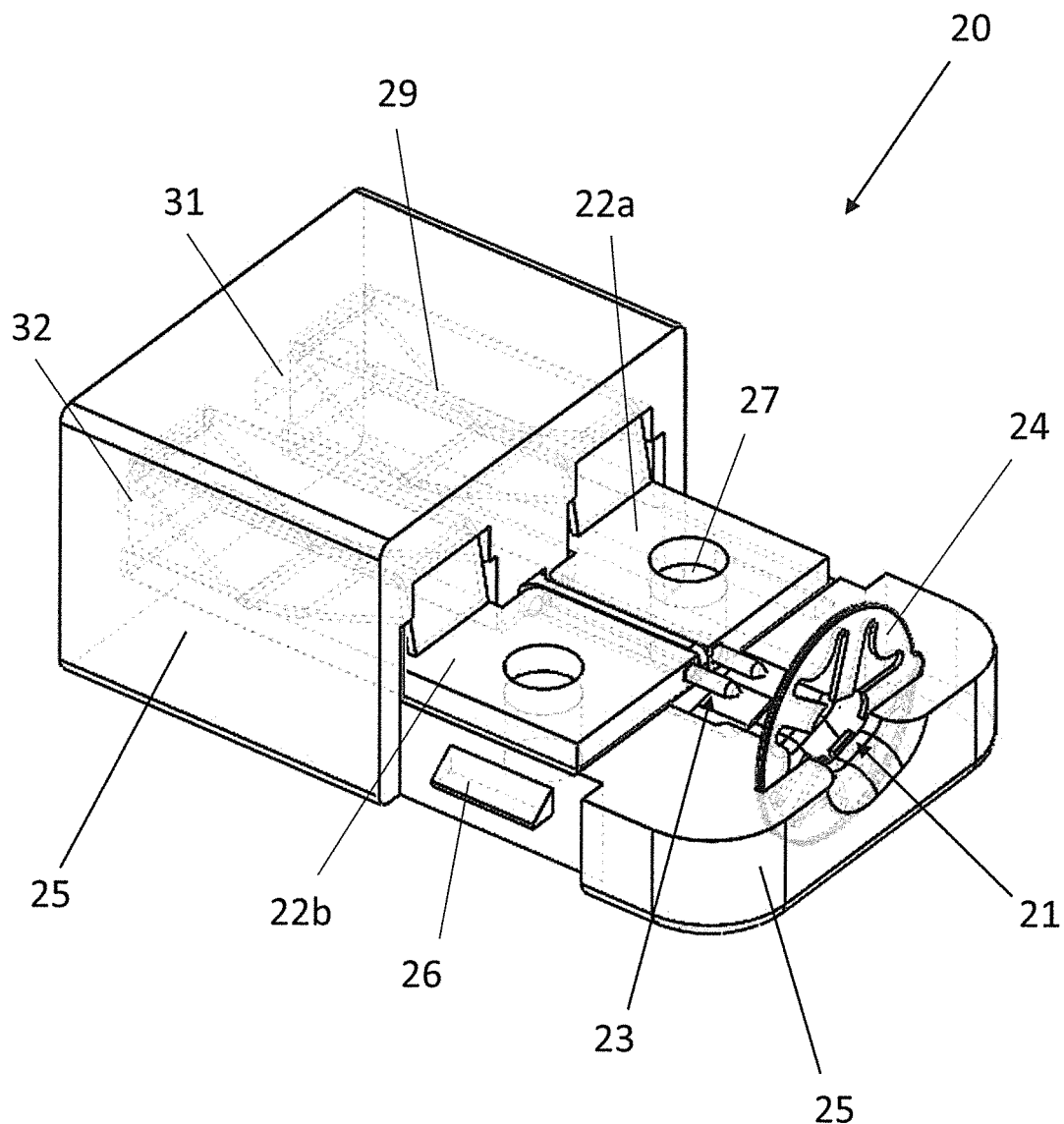
FIG. 4 shows a perspective view of a socket according to a preferred exemplary embodiment of the present invention.
Figure 5:
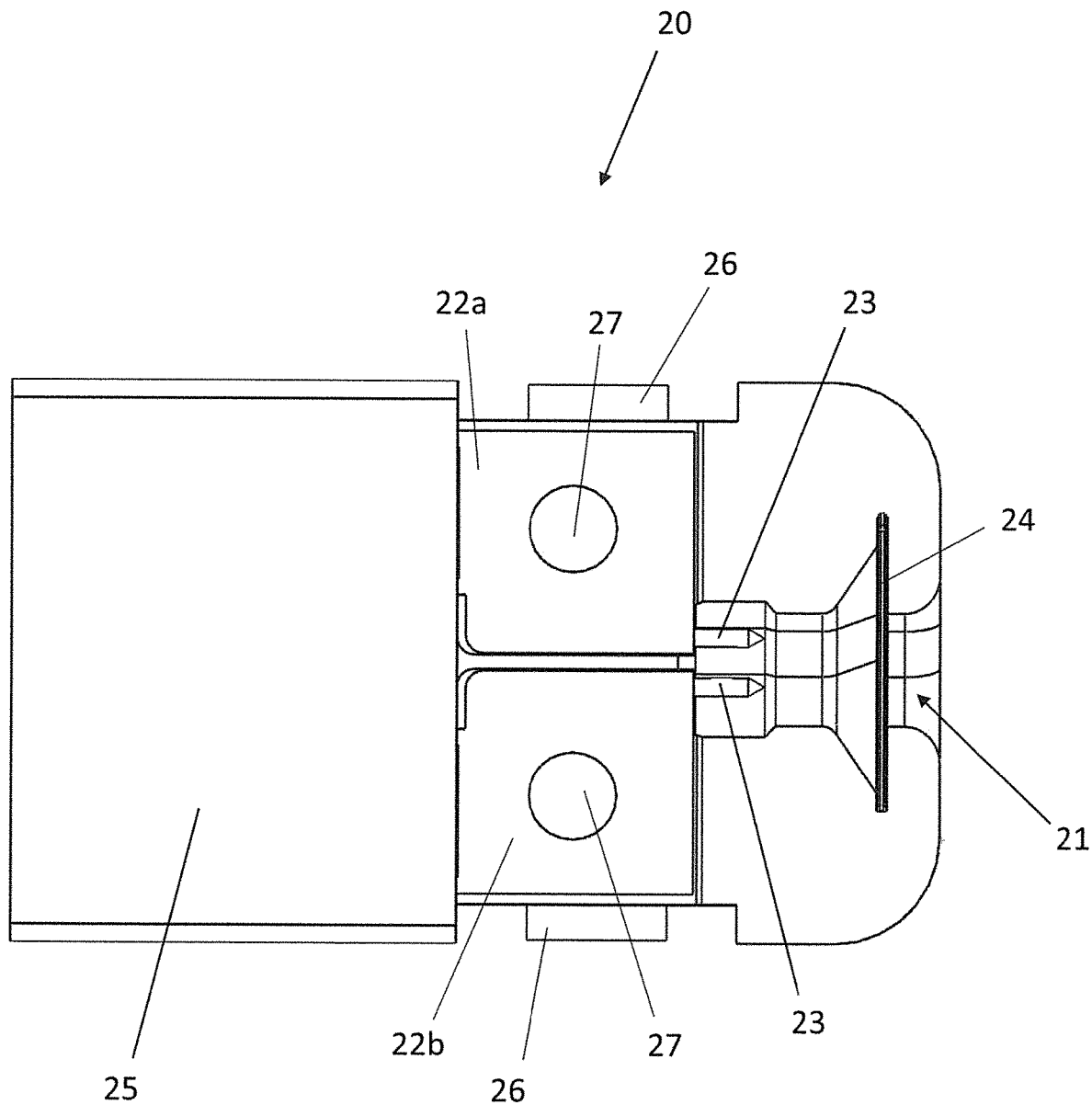
FIG. 5 shows a top view of a socket according to a preferred exemplary embodiment of the present invention.
Figure 6:
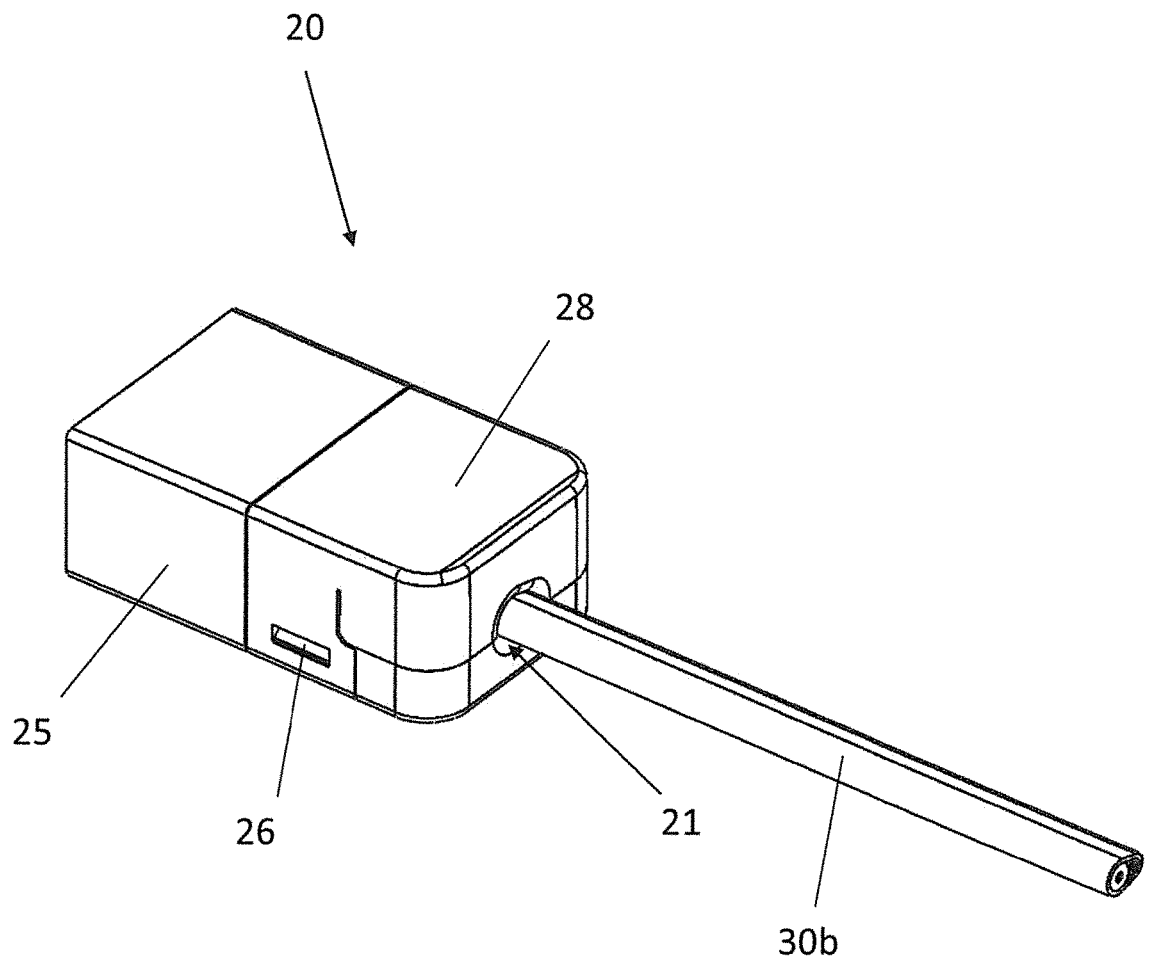
FIG. 6 shows a schematic illustration of an exemplary embodiment of the socket according to the invention, with an encoded thermoelectric conductor protruding therefrom.
Figure 7:
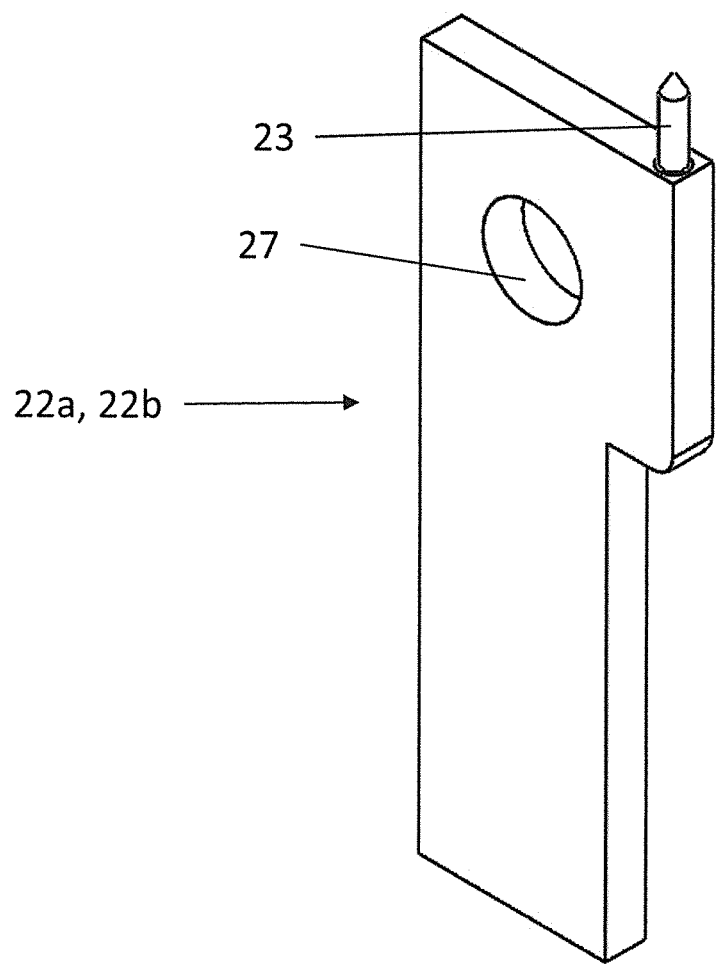
FIG. 7 shows a schematic illustration of an exemplary embodiment of a socket element according to the present invention.
Figure 8:
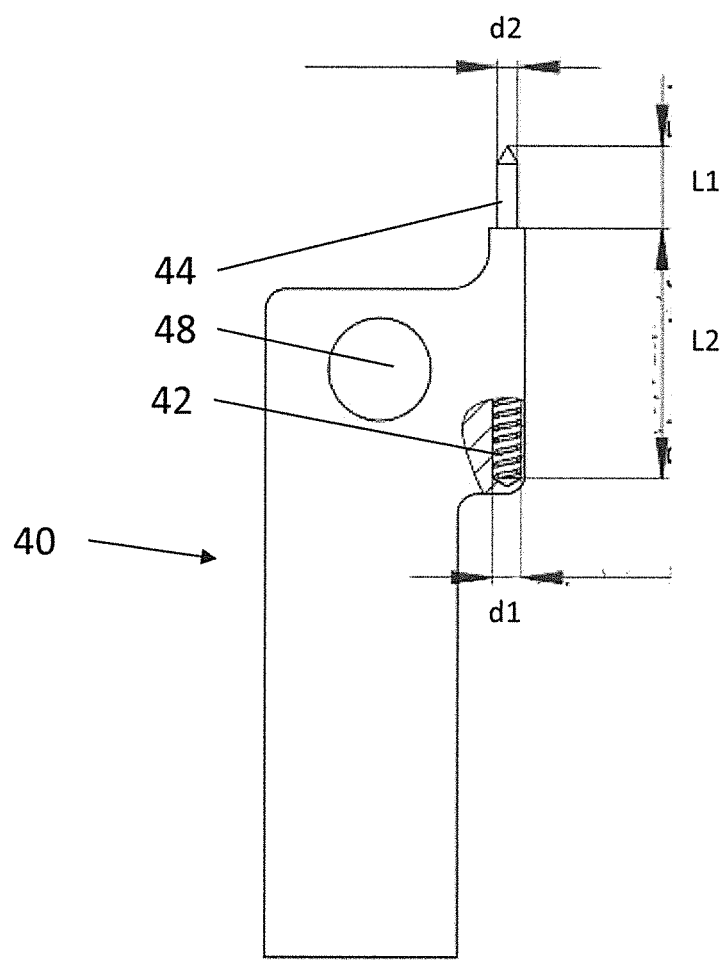
FIG. 8 shows a perspective view of a socket element according to an exemplary embodiment of the present invention.
Figure 9:
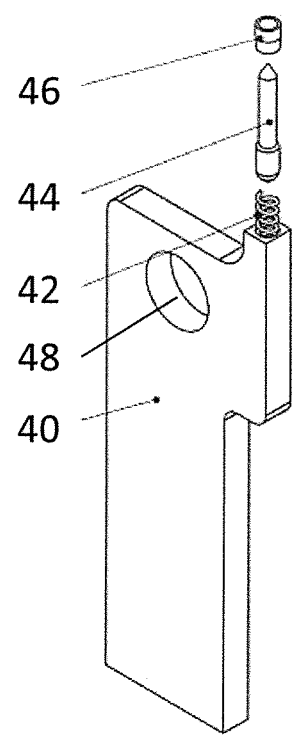
FIG. 9 shows a top view of a socket element according to the exemplary embodiment shown in FIG. 8.
Figure 10:
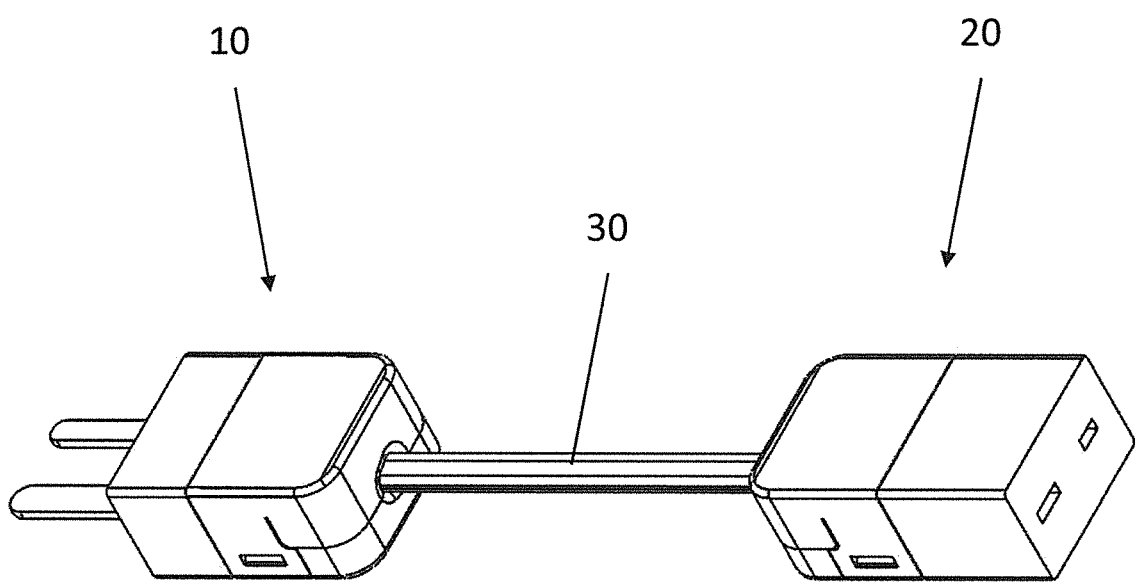
FIG. 10 shows a schematic illustration of an exemplary embodiment of a system according to the invention, comprising a plug and a socket.
Figure 11:
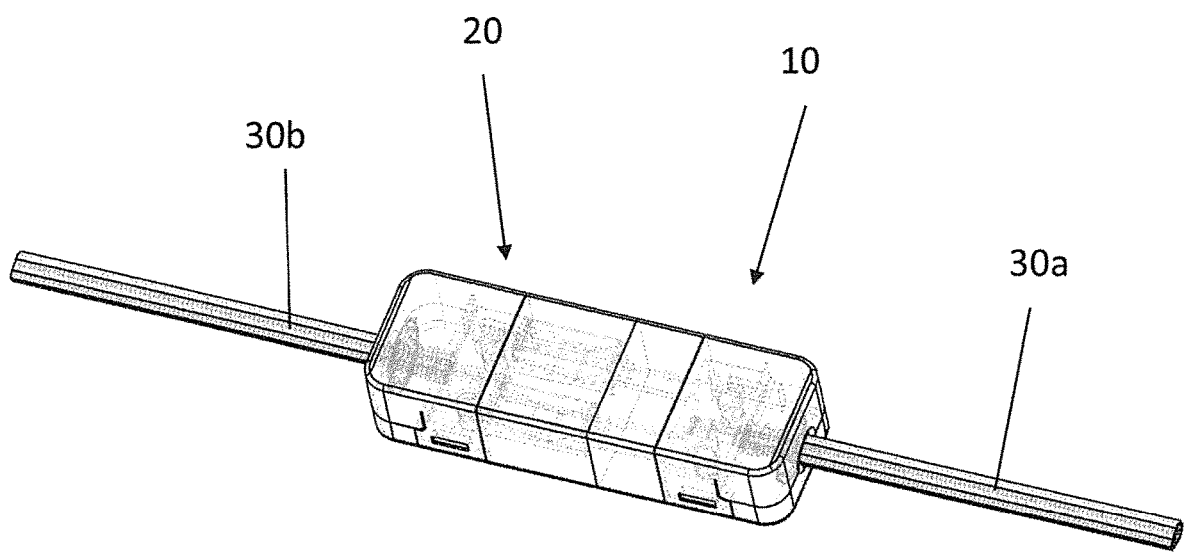
FIG. 11 shows another schematic illustration of an exemplary embodiment of a system according to the invention, comprising a plug and a socket.

An exemplary embodiment of a plug according to the present invention is illustrated in FIGS. 1 and 2. The plug is shown connected to an encoded thermoelectric conductor in FIG. 3. An exemplary embodiment of a socket according to the present invention is illustrated in FIGS. 4 and 5. In FIG. 6, the socket is shown connected to a thermoelectric conductor. An exemplary embodiment of a socket element is illustrated in FIG. 7. Another exemplary embodiment of a socket element is illustrated in FIGS. 8 and 9. Exemplary embodiments of a system comprising a plug according to the invention and a socket according to the invention are shown in FIGS. 10 and 11.

Prior to a detailed description, general explanations of the exemplary embodiments and their advantages shall first be given.

The plug according to the invention, the socket according to the invention, and the plug-and-socket system according to the invention are primarily intended for use in mobile vehicle measurement technology, but they are not limited in any way to this use. As such, the plug-and-socket system according to the invention is intended for any application in which encoded thermoelectric conductors are used in particular.

Furthermore, the plug-and-socket system is not limited exclusively to connecting thermoelectric conductors protected against polarity reversal. The invention can also be used, for example, to electrically connect a thermoelectric conductor protected against polarity reversal to a thermoelectric conductor not protected against polarity reversal. It is possible to connect a plug according to the invention, which is configured to receive a thermoelectric conductor protected against polarity reversal, to a socket known from the prior art, which has received a thermoelectric conductor not protected against polarity reversal. It is also conceivable to connect a socket according to the invention, which is configured to receive a thermoelectric conductor protected against polarity reversal, to a plug known from the prior art.

The exemplary embodiments relate to a plug. The term "plug" is understood to mean a pin or male, as long as not otherwise specified. The term "male" means "male" in this case, and refers to a plug connector with a protruding conductor.

The plug comprises a receiver that is configured to receive a thermoelectric conductor with an asymmetric cross section such that it is protected against polarity reversal. The receiver is therefore configured such that an encoded thermoelectric conductor can be inserted into the receiver in a manner protected against polarity reversal. Accordingly, the receiver can be shaped complimentary to the encoded thermoelectric conductor. The receiver can be in the shape of a channel, such that it is in contact at its circumference with a thermoelectric conductor inserted in the receiver. The cross section of the receiver can taper in some embodiments. As a result, in addition to a simplified assembly of the thermoelectric conductor on the plug, a robust mechanical connection between the plug and the thermoelectric conductor can also be obtained.

In some embodiments the receiver has a strain relief for relieving the strain and mechanically connecting a thermoelectric conductor received therein. The strain relief advantageously prevents the electrical connection between a thermoelectric conductor and the plug from becoming disconnected due to external effects (e.g. vibrations, tensile or pressure forces)

In some embodiments the strain relief can be an insulation-displacement connector or a locking cleat. The strain relief element can have at least one claw with a pawl, wherein the pawl presses into the insulation on a thermoelectric conductor that has been inserted therein, and thus secures the thermoelectric conductor in a manner similar to a barb. In a preferred embodiment, the claw has five pawls in order to secure the thermoelectric conductor inserted in module block at up to five locations. The pawls ensure that the thermoelectric conductor is not damaged by the strain relief.

The plug according to the invention also comprises first and second electrically conductive plug elements, each of which has a first and second region. The plug elements can be a contact plate or a type of flat pin. The two plug elements can be made in general of any common substance (e.g. copper, iron or nickel). Typically, standardized thermoelectric materials (e.g. type T, type R, type S, type B, type L, type U, type J, or type K) are used for the plug elements. The two plug elements according to the invention typically contain different substances.

In some embodiments, the first plug element is preferably made of nickel and the second plug element is made of chrome-nickel. In some embodiments, the two plug elements of the type K correspond to the thermoelectric materials, i.e. a first plug element is made of chrome and nickel (chromel), and the second plug element is made of aluminum and nickel (alumel).

The first regions of the plug elements according to the invention each have a spring contact. In some embodiments, the spring contact can be pressed into the plug element. The plug element and the spring contact can be an integral unit or comprised of numerous components.

In some embodiments, the spring contact comprises a spring element and a test probe.

The spring element can be a helical spring or a compression spring formed by a wire wound into a helix. Furthermore, the spring element can be any elastic element that is deformed to a certain extent when acted on by a specific force. The spring element is made of a metal (e.g. steel, copper) in some embodiments. In some embodiments, the compression spring is made of gold-plated steel. In some embodiments, the spring element is designed such that it has a maximum spring deflection of approx. 1-3 mm, preferably 2 mm. In this case, the spring element can exhibit a spring force of 130 cN±20% with a power stroke of 1.8 mm.

The test probe can form a needle-shaped, pointed contact. The test probe can be made of a thermoelectric material. In a preferred exemplary embodiment, the test probe is made of the same material as the associated plug element. For type K, this means that the test probe of the alumel plug element is made of alumel. The test probe can have a diameter of between 0.3 and 0.7 mm, preferably 0.5 mm.

In some embodiments, the spring contact also comprises a guide socket, which can be made of Teflon or PEEK.

The plug element according to the invention can have a hole in it with a diameter of between 0.5 and 0.9 mm, preferably 0.7 mm. In some embodiments, the spring contact is inserted in a hole.

The plug elements according to the invention are arranged such that the two spring contacts each come in substantially axial contact with a wire in a thermoelectric conductor that has been received therein. Each wire in a thermoelectric conductor is made up of numerous strands, preferably seven strands, resulting in intermediate spaces in the cross section of the wire. Electrical contact or an electrical connection is obtained accordingly when the two spring contacts penetrate the intermediate spaces in the respective wires made of numerous strands. Contact can also be ensured when one of the two spring contacts ends up between the insulating material for the wire and one or more strands. Contact can also be ensured when a spring contact touches the end surface of a wire. In a preferred embodiment, both spring contacts axially penetrate approx. 0.5 to 2 mm into a wire in the inserted thermoelectric conductor.

The spring contacts can be arranged in a plane in the plug. It is conceivable that this plane is horizontal or vertical in relation to the plug. The plug elements are arranged substantially parallel to a longitudinal axis of the plug in some embodiments. Furthermore, in some embodiments, the spring contacts are arranged substantially parallel to the longitudinal axis of plug. In some embodiments, the spring contacts are arranged such that they point toward the entry to the receiver from within the plug, in order to be able to come in axial contact with a wire in an inserted thermoelectric conductor.

In some embodiments, the spring element and the test probe interact such that when a thermoelectric conductor is received in the strain relief of the test probe, it comes in substantially axial contact with a wire in the thermoelectric conductor, wherein the spring force of the spring element exerts pressure on the thermoelectric conductor in order to enable a secure electrical connection of the spring contact with the received thermoelectric conductor. In this case, the spring force of the spring element and the test probe interact with the strain relief, i.e. when a thermoelectric conductor is inserted into the receiver in the plug, the thermoelectric conductor passes through the strain relief and then strikes the test probe of the spring contact. As a result of the pressure when it comes in contact with the test probe, the spring element becomes resiliently deformed, by means of which the spring element is compressed, and the thermoelectric conductor is pushed further into the receiver. When the spring force is greater than the force with which the thermoelectric conductor is inserted, or the maximum spring deflection of the spring element has been reached, the thermoelectric conductor cannot be inserted further. At the same time, the strain relief forms a purely mechanical securing of the thermoelectric conductor that is comparable to a barb, thus preventing any possible movement of the thermoelectric conductor out of the receiver in the plug.

In some embodiments, the receiver is part of a housing. Furthermore, the receiver can have an asymmetric cross section. The receiver in the housing can be shaped such that an encoded thermoelectric conductor can be inserted in a form fitting manner therein. The cross section of the thermoelectric conductor that is to be received, or the receiver in the plug, can have an asymmetrical corner or edge. The cross section can be composed of a circular curve segment and two flat sections that make a shape. Furthermore, the cross section of the receiver can be triangular, or have a "pear-shaped" or "teardrop" structure.

In some embodiments, the plug comprises a housing that has at least a first and second part that can be combined by means of a snap-fit assembly in order to secure the housing parts to one another, and to encompass the interior. Advantageously, it is possible thereby to close the housing without a screw connection. The housing can be made of plastic. The plug elements can be located in one of the housing parts. The housing can also comprise further housing parts.

In some embodiments, the plug elements are retained via guide bolts in one of the housing parts in a predetermined position, in order to prevent displacement in the longitudinal or transverse directions of the of the plug. When the guide bolts are formed on one of the housing parts, the other housing part has holes at the corresponding locations, that are configured to receive the bolts. The guide bolts are preferably formed on the housing part in which the plug elements are not located. This has the advantage that the plug elements can first be placed in a first housing part without tools, and subsequently secured in the longitudinal and transverse directions by the guide bolts in the second housing part when the two housing parts are joined.

In some embodiments, the plug element has at least one hole, by means of which the plug element engages with at least one guide bolt. Furthermore, the hole can also extend through the housing part on which the plug part is located.

The plug elements according to the invention also have a second region that is configured such that it can be received by a socket element to obtain electrical contact. The second region of a plug element can be oblong. In some embodiments, the second region of the plug element forms a pin-shaped element. The second regions of the two plug elements of the plug can have different widths, in order to protect against polarity reversal. Furthermore, the second regions of the plug elements can protrude form the housing for the plug. These protruding regions can be entirely received in a housing for a socket according to the invention. Advantageously, all of the conductors in the plug are located inside a housing when in the connected state, thus preventing short circuits. The second regions of the plug elements can also be encompassed by a housing part that slides in a form fitting manner over the housing for the socket element, thus sealing it, when it is connected to the housing for a socket element according to the invention.

Furthermore, the exemplary embodiments relate to a socket. The term "socket" refers to a contact or female, as long as not otherwise specified. The term "female" means "female," and indicates a plug-in connector that forms a sleeve around the male counterpart, or the second regions of the plug elements. The socket according to the invention is preferably connected to a plug according to any of the aforementioned embodiments.

The socket according to the invention comprises a receiver that is configured to receive a thermoelectric conductor that has an asymmetrical cross section in a manner protected against polarity reversal, and first and second electrically conductive socket elements that each have first and second regions. The first regions of the socket elements each have a spring contact. Furthermore, the socket elements are arranged such that the two spring contacts each substantially axially come in contact with a wire in a thermoelectric conductor received therein.

The receivers and the spring contacts in the first regions of the two socket elements can be identical to the receivers and the spring contacts in the first regions of the two plug elements. The aforementioned explanations of the receivers and spring contacts in the first regions of the two plug elements can therefore be applied analogously to the receivers and the spring contacts in the first regions of the two socket elements.

Accordingly, the spring contact in the socket in some embodiments comprises a spring element and a test probe that interact such that when receiving a thermoelectric conductor in the strain relief, the test probe makes substantially axial contact with a wire in the thermoelectric conductor, wherein the spring contact of the spring element exerts a pressure on the thermoelectric conductor to enable a secure electrical contact of the spring contact with the received thermoelectric conductor.

Furthermore, the receiver in the socket can contain a strain relief for relieving strain and mechanically connecting a thermoelectric conductor received therein. The explanations of the embodiments of the strain relief in the plug specified above apply analogously to the strain relief in the socket.

The housing for the socket has a first and second housing part in some embodiments that can be connected to one another by means of a snap-fit assembly, in order to hold the housing parts together and to encompass the interior. In addition, the housing can comprise a receiver, wherein the receiver has an asymmetrical cross section.

In some embodiments, the socket elements are retained in a predetermined position by guide bolts in one of the housing parts to prevent a displacement in the longitudinal and transverse directions.

In some embodiments, the socket element has at least one hole, by means of which the socket element engages with at least one guide bolt.

Analogous to the plug elements specified above, the first socket element can preferably be made of nickel and the second socket element can preferably be made of chrome-nickel. Moreover, the embodiments specified above can be applied analogously to the socket elements with regard to the materials of the plug elements.

In the socket according to the invention, the socket elements have a second region that is configured such that a plug element can be received therein to establish electrical contact. In some embodiments, the second region of the socket element is located entirely within the housing for the socket. The housing can have an opening near the second region of the socket element in which the second regions of the plug elements are received. In some embodiments, the openings in the housing near the second regions of the two socket elements can have different widths in order to provide protection against polarity reversal when receiving corresponding second regions of the plug elements of different widths in the socket housing.

In some embodiments, the socket comprises a contact spring element in the second region of the socket element that prevents a vertical movement of the socket element and to establish a secure electrical contact with the plug elements of a corresponding plug. The contact spring element is an elastic element that is arranged in the socket such that it exerts a force on the respective socket element. When inserting the plug elements into the socket housing, the contact spring element is pressed upward until at least the second region of the plug element is received in the socket. Furthermore, the contact spring element pushes against the second region of the plug element. Advantageously, both a mechanical and an electrical connection can be obtained between the plug and socket with such an embodiment.

The exemplary embodiments also relate to a system that comprises a plug according to any of the embodiments specified above and a socket according to any of the embodiments specified above. The plug and socket can preferably make electrical contact in order to electrically connect two thermoelectric conductors with one another.

In returning to the figures, FIG. 1 shows a perspective view of a plug according to the invention (wherein an upper housing cover is not shown, in order to better illustrate the interior of the plug). FIG. 2 shows a top view of the plug according to the invention without the upper housing cover. FIG. 3 shows the plug according to the invention connected to an encoded thermoelectric conductor. FIG. 4 shows a perspective view of a socket according to the invention (wherein an upper housing cover is not shown in order to better illustrate the interior of the socket). FIG. 5 shows a top view of the socket according to the invention without the upper housing cover. FIG. 6 shows the socket according to the invention connected to an encoded thermoelectric conductor. FIG. 7 shows an exemplary embodiment of a socket element according to the invention. Another exemplary embodiment of a socket element according to the invention is shown in FIGS. 8 and 9. Exemplary embodiments of a system comprising a plug according to the invention and a socket according to the invention are shown in FIGS. 10 and 11.

FIG. 1 shows an exemplary embodiment of a plug 10 according to the invention, wherein an upper housing part is not shown in order to better illustrate the interior of the plug 10.

The plug has a first housing part 15 that has two channels through a block-like section in a first region, which extend in the longitudinal direction of the plug 10. Two plug elements 12a, 12b have been placed in the channels. The first plug element 12a is made of alumel, while the second plug element 12b is made of chromel. The plug elements 12a, 12b can also be made of another arbitrary thermal material. Each of the plug elements 12a, 12b has a first region and a second region. The two plug elements 12a, 12b lie in a plane. A flatter housing section of the first housing part 15 adjoins the block-like housing section of the first housing part 15. The first regions of the plug elements 12a, 12b are located on this flatter housing section.

The first regions of the plug elements 12a, 12b each comprise a spring contact 13. The two spring contacts 13 of the plug elements extend in the longitudinal direction of the plug 10. The plug elements 12a, 12b are substantially parallel to the longitudinal direction of the plug 10. In addition, the spring contacts 13 are substantially centered when viewed from the perspective of the longitudinal axes of the plug elements 12a, 12b. The opposing lateral surfaces of the first regions of the plug elements 12a, 12b are spaced apart. Furthermore, the spring contacts 13 extending in the longitudinal direction are also spaced apart, such that they each come in contact with a wire in an encoded thermoelectric conductor received therein.

The second regions of the plug elements 12a, 12b are configured such that can be received by a socket in an electrically contacting manner. In this exemplary embodiment, the plug elements 12a, 12b are two oblong contact plates. The second region of the first plug element 12a is wider than the second region of the second plug element 12b. As a result, it can be ensured that the connection with a socket that has corresponding openings is protected against polarity reversal.

There is also a strain relief 14 in the flatter housing part. The strain relief 14 is in the form of an insulation-displacement connector. It has five clamps. These can be bent inward when receiving an encoded thermoelectric conductor, and can then cut into the insulation on the thermoelectric conductor that is inserted, by means of which it is mechanically secured in place.

The first housing part 15 also has a lateral extension in the form of a snap-fit hook 16 in the region of the flat housing section. This snap-fit hook 16 and another snap-fit hook 16 on the opposite side of the first housing part 15 mechanically connect a second housing part 18 (see, e.g., FIG. 3) to the first housing part 15. As a result, a screw connection for assembling the plug 10 is unnecessary.

The plug elements 12a, 12b each have a hole in the first region, which also extends through the underlying flat housing section. Guide bolts on the second housing part 18 enter these holes when connecting the first housing part 15 to the second housing part 18 (see, e.g., FIG. 3). As a result, the plug elements 12a, 12b can be inserted without tools, and the plug elements 12a, 12b are prevented from becoming displaced in the longitudinal and transverse directions of the plug 10.

The plug 10 also has a receiver 11. This has an asymmetrical cross section (when the housing is closed), in order to receive a thermoelectric conductor such that it is protected against polarity reversal. The receiver 11 also has a rounded off, tapered entry that facilitates the insertion of the encoded thermoelectric conductor. The strain relief 14 is also located in the region of the receiver 11. The five clamps on the strain relief 14 are arranged such that they form an opening with an asymmetrical cross section that is substantially identical to that of the receiver 11.

FIG. 2 shows a top view of the plug 10 according to the exemplary embodiment in FIG. 1. FIG. 2 shows that the two spring contacts 13 are arranged in a plane next to one another. Furthermore, the receiver has a rounded off region that facilitates the insertion of the thermoelectric conductor. The receiver 11 tapers in the longitudinal direction toward the interior of the plug 10. The strain relief 14 is formed in the region of the receiver, transverse to the longitudinal direction. There are two parallel test probes of the spring contacts 13 arranged in the longitudinal direction of the plug on the internal end of the receiver 11, which extend away from the first regions of the plug elements 12a, 12b. These are located such that they each make substantially axial contact with a wire in an encoded thermoelectric conductor, when it has been inserted.

FIG. 3 shows the plug 10 according to the exemplary embodiment in FIGS. 1 and 2, wherein the second housing part 18 is joined with the first housing part 15. The second housing part 18 is connected to the first housing part 15 with the two snap-fit hooks 16. Aside from the second regions of the plug elements 12a, 12b, all of the conductive components are located in the interior of the plug 10. Furthermore, an encoded thermoelectric conductor 30a is shown in FIG. 3, in the receiver 11 in the plug 10. In this exemplary embodiment, the receiver 11 in the plug 10 is configured to receive a "pear-shaped" thermoelectric conductor 30a, and to reliably make contact therewith with the test probes located in the plug 10.

FIG. 4 shows an exemplary embodiment of a socket 20 according to the invention, wherein an upper housing part (see reference symbol 28 in FIG. 6) is not shown, in order to better illustrate the interior of the socket 20.

The socket 20 has a first housing part 25, which has two channel-shaped hollow spaces in a first block-like housing section, which extend in the longitudinal direction of the socket 20. A socket element 22a, 22b is placed in each of the channel-shaped hollow spaces. The first socket element 22a is made of alumel, while the second socket element 22b is made of chromel. The socket elements 22a, 22b can also be made of any other arbitrary thermal material. Each of the socket elements 22a, 22b has a first and second region.

The first regions of the socket elements 22a, 22b each comprise a spring contact 23. The two spring contacts 23 in the socket elements extend in the longitudinal direction of the socket 20. The socket elements 22a, 22b are substantially parallel to the longitudinal direction of the socket 20. In addition, the spring contacts 23 are placed in the center, or are substantially centered, seen from the perspective of the longitudinal axes of the socket elements 22a, 22b. The opposing lateral surfaces of the first regions of the socket elements 22a, 22b are spaced apart and located in a (horizontal) plane. Furthermore, the spring contacts 23 extending in the longitudinal direction are spaced apart such that they each come in contact with a wire in an encoded thermoelectric conductor that has been inserted in the receiver 21.

The second regions of the socket elements 22a, 22b are configured such that a plug formed in the socket comes in contact with the second regions of the socket elements 22a, 22b. In this exemplary embodiment, the socket elements 22a, 22b are two oblong contact plates. The second regions of the two socket elements 22a, 22b each have the same width. Moreover, both socket elements 22a, 22b have identical dimensions. The second regions of the two socket elements 22a, 22b are entirely encompassed by the first housing part 25. On the side facing away from the first regions of the socket elements 22a, 22b, the first housing part 25 has two openings for receiving the plug elements of a corresponding plug. The two openings are of different width, such that it can be connected to a plug in a manner protected against polarity reversal.

A strain relief 24 is placed partly in the first housing part 25 in the region of the receiver 21 in a flatter housing section of the first housing part 25 that extends from the block-like housing section of the first housing part 25. The strain relief 24 is in the form of an insulation-displacement connector. It has five clamps. These can be bent inward when receiving an encoded thermoelectric conductor in the receiver 21, and then cut into the insulation on the received thermoelectric conductor, by means of which it is mechanically secured in place.

The first housing part 25 also has a lateral extension in the form of a snap-fit hook in the region of the flat housing section. This and an opposite snap-fit hook 26 mechanically join a second housing part 28 (see FIG. 6) to the first housing part 25. As a result, a screw connection for closing the socket 20 is unnecessary.

The socket elements 22a, 2b also each have a hole 27 in the first region, which also extends through the underlying flat housing section. Guide bolts on the second housing part 28 enter these holes 27 when joining the first housing part 25 with the second housing part 28 (see FIG. 6). As a result, the socket elements 22a, 22b cannot be displaced in the longitudinal and transverse directions of the socket 20.

The socket 20 also has a receiver 21. This has (when the housing is closed) an asymmetrical cross section that enables a thermoelectric conductor to be received therein such that it is protected against polarity reversal. The receiver 21 also has a rounded off, tapered entry region that facilitates the insertion of an encoded thermoelectric conductor. The five clamps on the strain relief 24 are arranged such that they form an opening that has an asymmetrical cross section that is substantially identical to the cross section of the receiver 21.

FIG. 5 shows a top view of the socket 20 according to the exemplary embodiment in FIG. 4. FIG. 5 shows that the two spring contacts 23 are located in a plane adjacent to one another. It can also be derived therefrom that the receiver 21 tapers in the longitudinal direction of the interior of the socket 20. A strain relief 24 extends transverse to the longitudinal direction in the region of the receiver 21. There are two test probes of the spring contacts 23 located on the inner end of the receiver 21 that extend parallel to the longitudinal direction of the socket, which extend from the first regions of the socket elements 22a, 22b, and each come in substantially axial contact with a wire when an encoded thermoelectric conductor is inserted in the receiver 21.

FIG. 6 shows the socket 20 according to the exemplary embodiment in FIGS. 4 and 5, wherein the second housing part 28 is connected to the first housing part 25. The second housing part 28 is joined to the first housing part 25 via the two snap-fit hooks 26. All of the conductive components of the socket 20 are located in the interior of the socket 20. Furthermore, and encoded thermoelectric conductor 30b is shown in FIG. 6, which is located in the receiver 21 in the socket. In this exemplary embodiment, the receiver 21 in the plug 10 is configured to receive a "pear-shaped" thermoelectric conductor 30b.

FIG. 7 shows a socket element 22a, 22b according to the exemplary embodiment of the socket in FIGS. 4 and 5. The socket elements 22a, 22b form contact plates or flat needles. The socket elements 22a, 22b are flat, oblong elements, with a substantially rectangular shape. The rectangular shape is interrupted by a lateral projection that extends along the longitudinal axes of the socket elements 22a, 22b. In addition, the spring contact 23 extends from the projection in the longitudinal direction of the socket elements 22a, 22b.

The socket elements 22a, 22b can be divided into a first region and a second region. The first region comprises at least the spring contact 23, which extends from a hole and the projection. The spring contact 23 comprises a spring element and a test probe, wherein only a part of the test probe is shown in FIG. 7. The spring element is not visible (cf. FIGS. 8 and 9). The hole extends into the lateral projections on the socket elements 22a, 22b, wherein the lateral projection extends in the longitudinal direction of the socket elements 22a, 22b. The first region also has a rounded opening or hole 27.

The second regions of the socket elements 22a, 22b substantially correspond to the oblong, rectangular, narrower extension of the first regions.

The first regions of the socket elements 22a, 22b shown therein correspond to the first regions of the plug elements 12a, 12b in terms of their construction in the exemplary embodiments shown in FIGS. 1 and 2. Only the second regions of the socket elements 22a, 22b differ from the second regions of the plug elements 12a, 12b in that the second regions of the plug elements 12a, 12b are of different widths.

FIGS. 8 and 9 show another exemplary embodiment of a socket element 40. The exemplary embodiments in FIGS. 8 and 9 differ from that in FIG. 7 only in terms of structural changes. With regard to the structure of the spring contact, they are identical.

The socket 40 comprises a spring element 42 and a test probe 44. The spring element 42 is a helical spring made of gold-plated steel. The spring element 42 is constructed such that it has a maximum spring deflection L1 of 2 mm. The spring element 42 has a spring force of 130 cN±20% with a power stroke of 1.8 mm.

The test probe 44 is a needle-shaped, pointed contact. The test probe 44 made of the same material as the socket element 40. For type K, this means that the test probe of the chromel socket element is made of chromel, and the test probe of the alumel socket element is made of alumel. The test probe has a diameter d2 of 0.5 mm. The socket element 40 has a hole with a diameter d1 of 0.7 mm. The hole has a depth L2 of 6.1 mm in the exemplary embodiment.

An exploded view of the socket element 40 is shown in FIG. 9. In addition to the spring element 42 and the test probe 44, the spring contact also has a guide socket 46, which can be made of Teflon or PEEK.

The spring contact in the socket element according to the exemplary embodiment in FIGS. 8 and 9 is identical to the spring contact in the plug element according to the invention. In addition, the manner in which contact is made with a wire in a thermoelectric conductor received in the receiver is identical for both the socket according to the invention and the plug according to the invention.

A system composed of a plug 10 according to the invention, a socket 20 according to the invention, and an encoded thermoelectric conductor 30 is shown in FIG. 10. In the exemplary embodiment, a single thermoelectric conductor segment 30 connects the plug 10 to the socket 20. The encoded thermoelectric conductor 30 is inserted at one end in the receiver in the plug, and at the other end in the receiver in the socket 20.

Another exemplary embodiment of a system according to the invention, comprised of a plug and a socket, is shown in FIG. 11. In this case, a plug 10 is connected to an encoded thermoelectric conductor 30a. The plug 10 is configured such that the plug elements are received in a socket 20. The housings for the plug 10 and the socket 20 are joined such that they are flush to one another. An encoded thermoelectric conductor 30b extends in turn from the socket 20. The system according to the invention, comprised of a plug and a socket, is not limited to the exemplary embodiments shown in FIGS. 10 and 11. Instead, any combination of the plug according to the invention and the socket according to the invention for connecting encoded thermoelectric conductors is comprised therein. The invention also includes a system in which the plug or the socket according to the invention is used with plugs or sockets known in the prior art for connecting encoded and un-encoded thermoelectric conductors.

The invention claimed is:

1. A plug for an electrical plug-in connection, wherein the plug comprises:
   a receiver having an asymmetrical cross section and configured to receive a thermoelectric conductor with an asymmetrical cross section in a manner protected against polarity reversal, the receiver formed as part of a housing, and
   first and second electrically conductive plug elements, each of which has a first and second region,
   wherein the first regions of the plug elements each have a spring contact, and the plug elements are arranged such that the two spring contacts each make substantially axial contact with a wire in a thermoelectric conductor that has been received therein, and
   wherein the second regions of the plug elements are configured such that they can be received in a socket element to establish electrical contact.

2. The plug according to claim 1, in which the receiver has a strain relief for relieving the strain and mechanically connecting a thermoelectric conductor that has been received therein.

3. The plug according to claim 2, in which the spring contact comprises a spring element and a test probe that interact such that when a thermoelectric conductor is received in the strain relief, the test probe makes substantially axial contact with a wire in the thermoelectric conductor, wherein the spring force of the spring element exerts a pressure on the thermoelectric conductor to enable a secure electrical connection of the spring contact with the thermoelectric conductor that has been received therein.

4. The plug according to claim 1, in which the housing has at least a first and second housing part, which can be joined by means of a snap-fit assembly in order to hold the housing parts together, and encompass an interior of the housing.

5. The plug according to claim 4, in which the plug elements are held in a predetermined position via guide bolts in one of the housing parts, such that a displacement in the longitudinal and transverse directions is prevented.

6. The plug according to claim 5, in which the plug elements have at least one hole, by means of which the plug elements engage with at least one guide bolt.

7. The plug according to claim 1, in which the first plug element is made of nickel, and the second plug element is made of chrome-nickel.

8. The plug according to claim 1, in which the plug is configured to make electrical contact with a socket to electrically connect two thermoelectric conductors to one another.

9. A socket for an electrical plug-in connection, wherein the socket comprises:
   a receiver that is configured to receive a thermoelectric conductor with an asymmetrical cross section in a manner protected against polarity reversal, the receiver having an asymmetrical cross section and formed as part of a housing, and
   first and second electrically conductive socket elements, each of which has a first and second region,
   wherein the first regions of the socket elements each have a spring contact, and the socket elements are arranged such that the two spring contacts each come in substantially axial contact with a wire in a thermoelectric conductor that has been received therein, and wherein the second regions of the socket elements are configured to receive a plug element such that electrical contact is established.

10. The socket according to claim 9, also comprising:

a contact spring element, which is located in the second regions of the socket elements, in order to prevent a vertical movement of the socket elements and to provide a secure electrical contact with the plug elements in a corresponding plug.

11. The socket according to claim 9, in which the socket is configured to make electrical contact with a plug to electrically connect two thermoelectric conductors to one another.

12. The plug according to claim 1, in which the receiver has a strain relief for relieving the strain and mechanically connecting a thermoelectric conductor that has been received therein.

13. The plug according to claim 1, wherein the receiver has a pear-shaped cross section.

\* \* \* \* \*